US007438107B2

(12) United States Patent
Kost

(10) Patent No.: US 7,438,107 B2
(45) Date of Patent: Oct. 21, 2008

(54) METHOD AND DEVICE FOR ATTACHING A SUPPLEMENTARY PRODUCT THAT IS AT LEAST APPROXIMATELY FLAT TO A SIDE OF A PRINTED PRODUCT

(75) Inventor: Roland Kost, Oftringen (CH)

(73) Assignee: Müller Martini Holding AG, Hergiswil (CH)

( * ) Notice: Subject to any disclaimer, the term of this patent is extended or adjusted under 35 U.S.C. 154(b) by 0 days.

(21) Appl. No.: 11/111,068

(22) Filed: Apr. 21, 2005

(65) Prior Publication Data

US 2005/0241753 A1 Nov. 3, 2005

(30) Foreign Application Priority Data

Apr. 23, 2004 (EP) .................................. 04405251

(51) Int. Cl.

*B42C 1/10* (2006.01)
*B65C 9/18* (2006.01)
*B65C 9/26* (2006.01)
*B29C 65/48* (2006.01)
*B31F 5/00* (2006.01)
*B42B 9/04* (2006.01)
*B29C 65/50* (2006.01)
*B29C 65/56* (2006.01)

(52) U.S. Cl. ....................... 156/564; 156/556; 156/567; 156/569; 156/573; 156/460; 270/52.01; 270/52.07; 270/52.2

(58) Field of Classification Search . 156/DIG. 28–DIG. 30, DIG. 25, DIG. 37, 573, 460, 556, 567, 156/569; *B42C 1/10*
See application file for complete search history.

(56) References Cited

U.S. PATENT DOCUMENTS 4,242,168 A * 12/1980 Carter ........................ 156/357
4,493,482 A * 1/1985 Valenti et al. ................. 270/12
4,579,620 A 4/1986 Flensburg et al.

FOREIGN PATENT DOCUMENTS

| | | |
|---|---|---|
| DE | 2 135 303 | 8/1973 |
| EP | 0 422 257 | 4/1991 |
| EP | 1 156 003 | 11/2001 |
| EP | 1 275 607 | 1/2003 |

* cited by examiner

*Primary Examiner*—Philip C Tucker
*Assistant Examiner*—Sonya Mazumdar
(74) *Attorney, Agent, or Firm*—Friedrich Kueffner

(57) ABSTRACT

For attaching at least one flat supplementary product to a printed product, one leaf of the printed product is brought from a folded configuration into an essentially horizontal orientation. A supplementary product is attached, especially by an adhesive, to this horizontal leaf, preferably from above. Supplementary products can be attached to the front side and to the rear side of the printed product. The supplementary product is, for example, a commercial sample or a card.

6 Claims, 3 Drawing Sheets

METHOD AND DEVICE FOR ATTACHING A SUPPLEMENTARY PRODUCT THAT IS AT LEAST APPROXIMATELY FLAT TO A SIDE OF A PRINTED PRODUCT

BACKGROUND OF THE INVENTION

1. Field of the Invention

The invention relates to a method for attaching a supplementary product that is at least approximately flat to at least one side of the leaves of a printed product that is being conveyed astride a revolving conveyor chain with the leaves hanging down on both sides. The invention also relates to a device for carrying out this method.

2. Description of the Related Art

The attachment of supplementary products, for example, commercial samples or cards, on printed products is well known. EP 1 156 003 A1 describes a gathering machine with at least one movable feeder, which can be positioned at different sites along a gathering chain, depending on requirements, and with which supplementary products can be attached to the conveyed printed products. With this device, different designs are necessary for the attachment of supplementary products to printed products in front of and behind the gathering chain, since the gluing direction changes relative to the feeder.

EP 1 275 607 A1 describes a device for attaching supplementary products, in which device the supplementary products are delivered to a drum, which has revolving elements with suction devices for holding the supplementary products. A drum of this type is expensive and susceptible to malfunctions. Furthermore, this device cannot be used in a gathering machine equipped with a gathering chain.

SUMMARY OF THE INVENTION

It is the object of the present invention to develop a method and a device with which supplementary products can be attached to printed products on a conveyor chain. It should be possible to attach the supplementary products to both the front side and the rear side of a printed product, even during a gathering process on a gathering machine.

In accordance with the method, the present invention provides that the leaf is raised into an approximately horizontal position, and the supplementary product is fed to the printed product in at least approximately the same direction and at at least approximately the same speed. In the method of the invention, with the leaves raised, the supplementary product can be attached from above to the front side or the rear side or to the inner sides, for example, by gluing. It is also possible to attach supplementary products to the front side and the rear side simultaneously.

The supplementary product can be attached essentially over the entire side region. An essential point is that it is possible to attach the supplementary product on all side surfaces with the same device. After the supplementary product has been attached, the printed product is moved back into the original (closed) position and can then be further processed, for example, in a cutting device. Another essential aspect is that the location of the device within a conveyor chain or gathering chain can be freely selected. Accordingly, the supplementary product can be attached, for example, before or after a stitching machine.

In accordance with a further development of the invention, the supplementary product can be attached to the printed product by self-adhesion. The horizontal orientation of the leaves of a printed product has the advantage, among others, that it is possible to position the supplementary product by a displacement transverse to the conveyor chain or gathering chain.

The supplementary product can be fed to one or more exposed sides of the leaves of a printed product, so that a universal embodiment is possible.

The supplementary products can be fed from above and/or from below to the leaves of the printed product, which have been moved into a horizontal position.

The reverse side of a printed product from the side to which the supplementary product is to be fed can be supported while the supplementary product is being attached, so that a certain contact pressure can be applied.

It is possible to feed a supplementary product to each of the sides.

During the conveyance of the printed product, it is advantageous to raise the leaves of a printed product by a stationary guide device that acts on the inner side or on the side of a leaf that rests on the conveyor chain.

It has been found to be effective if, during the raising of one or both leaves, the attachment of the supplementary product, and the lowering of the leaf or leaves, the printed product is held on the conveyor chain by a holddown device, e.g., a roll or brush, which acts, for example, on the fold of the printed product, so that the operating reliability and quality of the work are improved.

A device for carrying out the method of the invention includes a revolving conveyor chain or gathering chain, which has pushers and a saddle-shaped support for the printed products, which are conveyed astride the chain. The device further includes a stationary guide device which is arranged along the conveyor chain and effects the raising of at least one leaf of a printed product, and a feeding device for supplementary products, which is assigned to this stationary guide device on the opposite side of the leaf that has been moved into a horizontal position. This simple device allows high quality and reliability requirements to be placed on production in accordance with the method of the invention.

The device can have a guide device, which is designed as a stationary guide plate that increasingly rises in the conveyance direction and acts on an inner side of a leaf of a printed product or as a liftable flap, so that the printed products are treated gently during the procedure in accordance with the method of the invention.

The guide plate, which can be designed to be adjustable, preferably opens into an approximately horizontal support surface that consists of a flat plate, on which the transfer of a supplementary product to a printed product occurs.

If a flap, which can be swung upward as a printed product approaches, is provided instead of a guide gate, then the transfer can occur as soon as the flap assumes a horizontal position and forms a support surface.

The feeding device can be a conveyor belt designed as a carrier of conveyed supplementary products, to which the supplementary products adhere or are fastened before they are transferred to the printed products.

The conveyor belt can be endless and pick up the supplementary products from a stack and then transfer them to a printed product.

In addition to the receiving end facing the stack of supplementary products, the endlessly revolving conveyor belt has a delivery end that faces the support surface or the printed products passing the support surface.

It is advantageous for the delivery end of the feeding device to rest on the support surface, so that a certain contact pressure develops on the supplementary product. The contact pressure can be produced by the force of a spring, which provides a certain amount of elasticity when the supplementary product is pressed.

The feeding device is preferably designed in such a way that it can be selectively used for one or the other of the leaves of a printed product on the front or rear side of the conveyor chain or gathering chain without additional modification measures. For this purpose, the feeding device can be displaced transversely with respect to the conveyor chain or gathering chain towards the front or rear side.

Naturally, it is possible to place a feeding device on each side of the conveyor chain or gathering chain, so that two leaves of a printed product can be provided with supplementary products.

In a further development of the device of the invention, a magazine for holding two stacks of supplementary products arranged side by side in the direction of conveyance is assigned to the feeding device, to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE INVENTION

Figure 1:
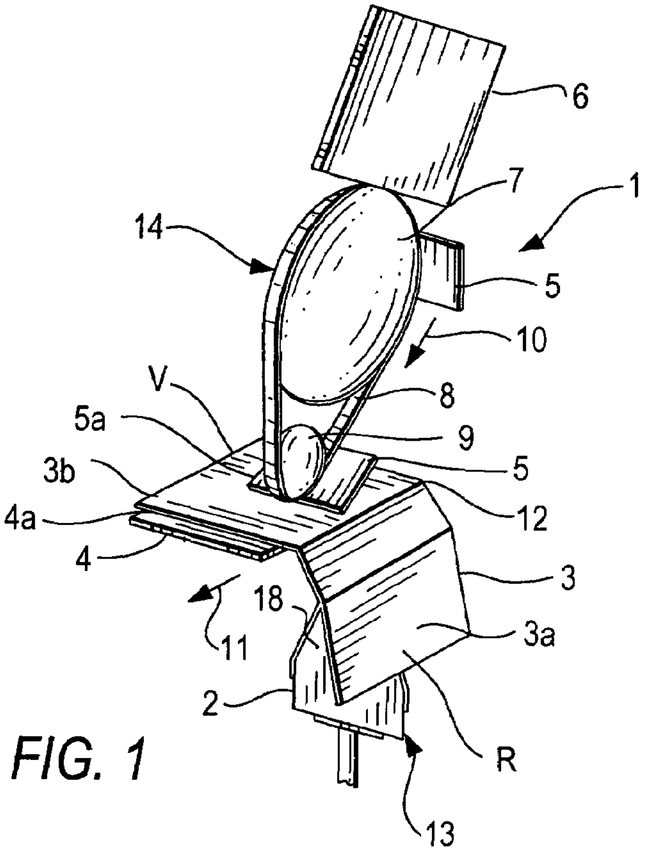
FIG. 1 is a schematic perspective view of a device in accordance with the invention.
Figure 2:
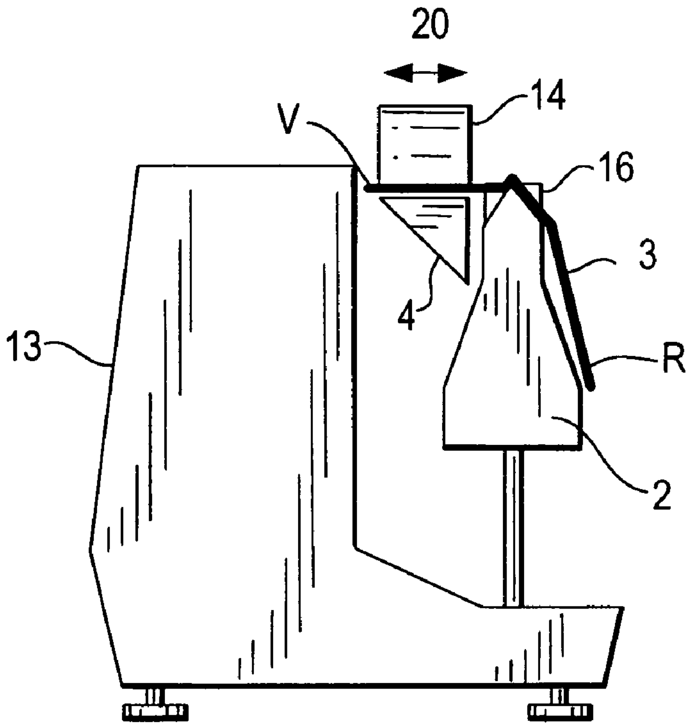
FIG. 2 is a schematic cross sectional view through a gathering machine equipped with a device of the invention, in which a supplementary product is attached to the front side of a printed product.

FIG. 1 shows a device 1 of the invention, which is arranged above a conveyor chain or gathering chain 2 of a gathering machine 13. The gathering chain 2, which in itself is already well known, forms an endless conveying device and has a saddle-shaped region 18, astride which printed products 3 are conveyed. The printed products 3 are pushed with wing-shaped, laterally projecting pushers 16 (FIG. 2). The printed products 3 are especially sheets with a fold 12 that extends in the conveying direction of the gathering chain 2.

The device 1 is used to attach at least one supplementary product 5 on each printed product 3. The supplementary product 5 is, for example, a commercial sample, a card, or a compact disk (CD), and thus is preferably a flat product. The supplementary product 5 can be attached to the front side V and/or the rear side R of the printed product 3. Accordingly, one or more supplementary products 5 can be selectively attached to one printed product. For example, it is possible to attach four supplementary products 5 to the printed product 3, for example, two supplementary products on the front side V and two supplementary products 5 on the rear side R. These supplementary products 5 that are attached to a printed product 3 can be the same or different.

Figure 5:
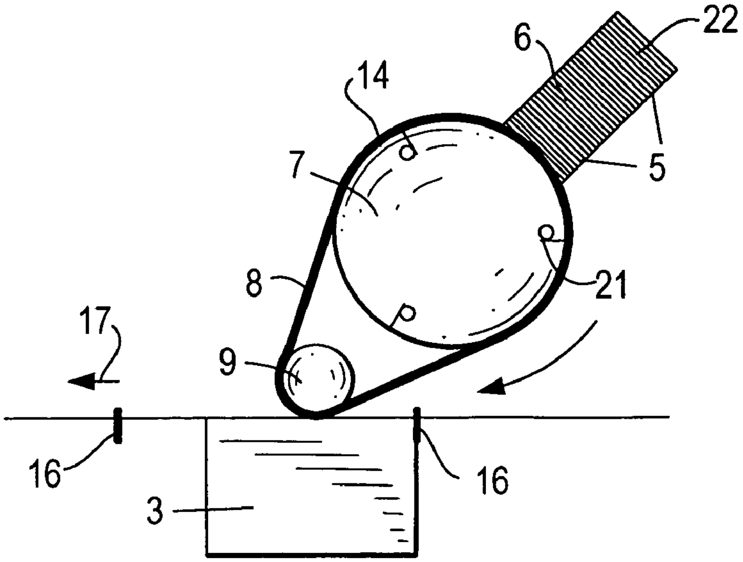
FIG. 5 is a schematic side view of the device of the invention.

As shown in FIGS. 1 and 5, the device 1 has a feeding device 14 with a belt 8 or other suitable endless conveying device that is placed around an extraction roll 7 and a contact roll 9. As FIG. 5 shows, several grabbers 21 or other suitable means are arranged on the extraction roll 7, with which at least one supplementary product 5 at a time can be extracted from a stack 22. The stack 22 is formed in a magazine 6 that is open at the bottom, so that the lowermost supplementary product 5 can be extracted. In principle, the magazine 6 can also be designed in such a way that more than one supplementary product 5 can be simultaneously extracted. A design in which the stack 22 can be moved laterally inside the magazine 6 is also possible. Moreover, a design in which several stacks 22 are simultaneously formed in the magazine 6 is conceivable as well. The extracted supplementary product 5 is conveyed to the contact roll 9 by the belt 8. The direction of conveyance is indicated in FIG. 1 by arrow 10. Below the contact roll 9, a printed product 3 is conveyed by the gathering chain 2. The printed product moves synchronously with the supplementary product 5 that is to be attached to it. In FIG. 2, the supplementary product 5 is attached to the front side V of the printed product 3, for example, by an adhesive. This method of attachment is preferred. The adhesive can be applied to the supplementary product 5, for example, after it has been extracted from the stack 22. The adhesive can be applied, for example, by spraying. Suitable means of applying an adhesive are already familiar to the expert and therefore do not need to be explained here. The feeding device 14 thus also serves as an isolating device, which isolates the supplementary products 5 of the stack 22 and feeds them one at a time to a printed product 3. The conveyance of the isolated supplementary products 5 in the region of the contact roll 9 finally changes over to the direction of conveyance of the gathering chain 2, which is indicated in FIG. 1 by arrow 11. When the supplementary product 5 has reached the printed product 3, first a front edge **5*a* of the supplementary product 5 is set down on the printed product 3. This front edge 5*a* is now moving at the same speed as the printed product 3. The speed of the feeding device 14 is adjusted accordingly. Naturally, the supplementary product 5 is applied synchronously with the gathering chain 2 or gathering machine 13**.

If the supplementary product 5 is attached to the front side V, as shown in FIG. 1, then the front side V is placed in a horizontal orientation, as shown in FIG. 2. The rear side R and the fold 12 remain in their original conveyed position. To bring the front side V into the specified essentially horizontal orientation, guide devices 4 are provided, which, for example, are formed by a guide plate, which, as FIG. 1 shows, forms a horizontal support surface **4*a*. The guide device 4 lifts the front side V during conveyance into the essentially horizontal position shown in FIG. 1**.

As shown in FIG. 2, the feed device 14 can be moved in the directions of the double arrow 20 horizontally and transversely to the direction of conveyance of the gathering chain 2. This makes it possible to make any desired adjustment of the distance of the supplementary product 5 from the fold 12. In addition, provision is preferably made for movement of the feeding device 14 in the direction of conveyance of the gathering chain 2. This makes it possible to select any desired position in which the supplementary product 5 is applied to the front side V.

Figure 3:
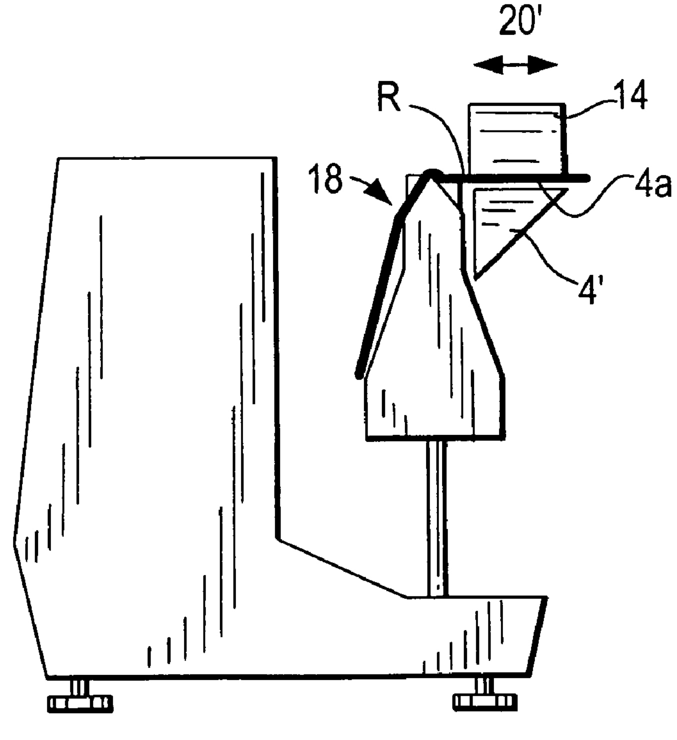
FIG. 3 is a schematic view in accordance with FIG. 2, in which, however, the supplementary product is attached to the rear side of the printed product.

FIG. 3 shows an arrangement in which a supplementary product 5 is applied to the rear side R. A guide device 4' with a horizontal support surface **4*a*' is thus installed on the gathering chain 2 on the right side, as shown in FIG. 3. The feeding device 14 is likewise installed to the right of the saddle-shaped region 18. The supplementary product 5 is conveyed and pressed onto the printed product 3 as explained above. The guide devices 4 and 4'** are detachable.

Figure 4:
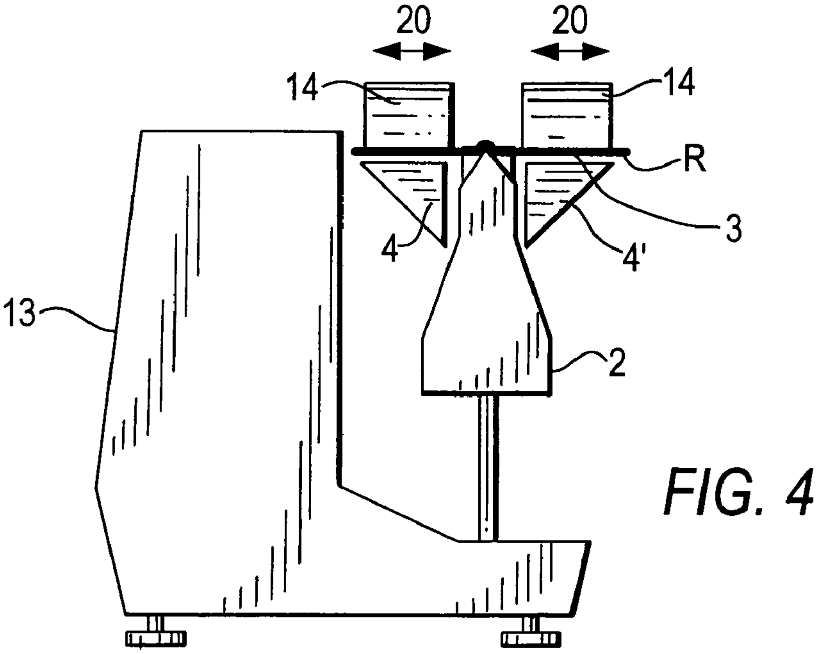
FIG. 4 is a schematic view in accordance with FIG. 2, in which, however, at least one supplementary product is attached to the front side and the rear side of the printed product simultaneously.

FIG. 4 shows an arrangement in which both guide devices 4 and 4' are installed. Both the front side V and the rear side R are simultaneously horizontally oriented. The feeding device 14 applies a supplementary product 5 to the front side V, and a second feeding device 14' simultaneously applies a supplementary product 5 to the rear side R. The feeding device 14 can be moved in the directions of the double arrow 20 transversely to the direction of conveyance of the gathering chain 2, and the feeding device 14' can be moved in the directions of the double arrow 20'. In another possible embodiment, two additional feeding devices are installed before or after the two feeding devices 14 and 14' in the direction of conveyance of the gathering chain 2. This allows two supplementary products 5 to be simultaneously applied to the printed product 3 and then another two supplementary products 5 to be applied, so that all together four supplementary products 5 are applied.

In another schematic representation, FIG. 5 shows how the supplementary product 5 of the stack 22 is individually conveyed to the printed product 3 with grabbers 21. The printed product 3 is conveyed from right to left in FIG. 5 in the direction of arrow 17. The conveying speed is not varied during the pressing operation. The speed of the belt 8 is thus adjusted to the conveying speed of the gathering chain 2. In addition, the extraction of the supplementary product 5 and the pressing of the supplementary product 5 onto the printed product 3 are done in synchronization with the gathering chain 2. As the drawing shows, a printed product 3 is positioned between two pushers 16 and rests against the tear pusher. The feeding device 14 is preferably supported in such a way that it can be adjusted in the direction of arrow 17 and in the opposite direction. The position of the supplementary product 5 on the printed product 3 can thus be infinitely adjusted in the direction of the fold 12 as well. In principle, a transverse adjustment would also be possible, and the axes of the extraction roll 7 and the contact roll 9 thus run transversely to the direction of the arrow or the direction of the fold 12.

Figure 6:
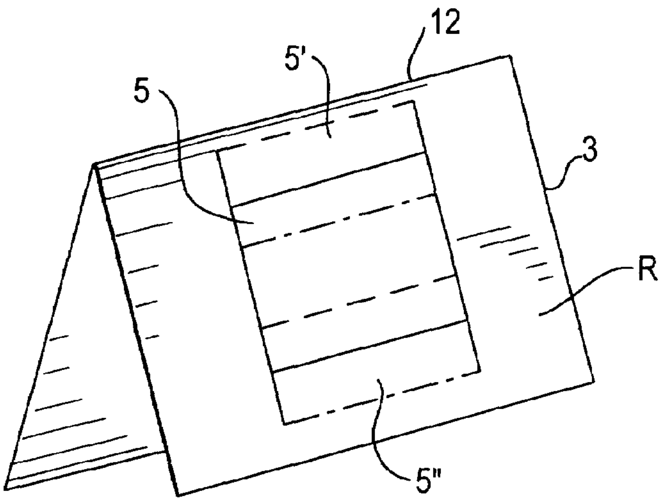
FIG. 6 is a perspective view of a printed product with a supplementary product attached.

FIG. 6 shows a printed product 3 with a supplementary product 5 attached approximately in the center of the rear side R. A supplementary product 5', which is indicated by broken lines, is laterally displaced and attached closer to the fold 12. A supplementary product 5", which is indicated by dot-dash lines, is displaced in the opposite lateral direction. The position of the supplementary product 5 can also be shifted in a continuously variable way in the direction of the double arrow 19. Finally, other transversely running orientations of the supplementary product 5 are also conceivable.

I claim:

1. A device for attaching a supplementary product that is at least approximately flat to at least one side of the leaves of a printed product, comprising a revolving conveyor chain, which has pushers and a saddle-shaped support for printed products, which are conveyed astride the chain, further comprising a guide device arranged along the conveyor chain for effecting the raising of at least one leaf of the printed product, and a first feeding device for supplementary products, which is assigned to this guide device, arranged on the opposite side of the leaf that has been raised into a horizontal position, wherein the guide device is comprised of a stationary guide plate that increasingly rises in a conveyance direction and acts on an inner side of a leaf, wherein the guide plate opens into an approximately horizontal support surface, wherein the feeding device has a conveyor belt that is a carrier of conveyed supplementary products, wherein the conveyor belt is an endless conveyor belt, further comprising means for extracting the supplementary products from a stack and for feeding the products to the side of a leaf, wherein a delivery end of the conveyor belt rests on the support surface; and wherein the first feeding device is selectively positionable on both sides of the conveyor chain.

2. The device in accordance with claim 1, comprising the first feeding device being positionable on one side of the conveyor chain and a second feeding device being positionable on another side of the conveyor chain.

3. The device in accordance with claim 2, wherein each feeding device has an extraction end for picking up supplementary products one by one from a magazine in which they are stacked, and wherein the supplementary products are attached to the extraction end of the feeding device in a way that allows them to be conveyed.

4. A device for attaching a supplementary product that is at least approximately flat to at least one side of the leaves of a printed product, comprising a revolving conveyor chain, which has pushers and a saddle-shaped support for printed products, which are conveyed astride the chain, further comprising a guide device arranged along the conveyor chain for effecting the raising of at least one leaf of the printed product, and a first feeding device for supplementary products, which is assigned to this guide device, arranged on the opposite side of the leaf that has been raised into a horizontal position, wherein the guide device is a liftable flap, wherein the liftable flap is a support surface, wherein the feeding device has a conveyor belt that is a carrier of conveyed supplementary products, wherein the conveyor belt is an endless conveyor belt, further comprising means for extracting the supplementary products from a stack and for feeding the products to the side of a leaf, wherein a delivery end of the conveyor belt rests on the support surface; and wherein the first feeding device is selectively positionable on both sides of the conveyor chain.

5. The device in accordance with claim 4, comprising the first feeding device being positionable on one side of the conveyor chain and a second feeding device being positionable on another side of the conveyor chain.

6. The device in accordance with claim 5, wherein each feeding device has an extraction end for picking up supplementary products one by one from a magazine in which they are stacked, and wherein the supplementary products are attached to the extraction end of the feeding device in a way that allows them to be conveyed.

* * * * *